United States Patent [19]

McGregor et al.

[11] 4,290,929

[45] Sep. 22, 1981

[54] AQUEOUS SOLUTIONS OF POLYESTERIMIDES AND METHODS OF MAKING THE SAME

[75] Inventors: Charles W. McGregor; Joseph Karkoski, both of Fort Wayne, Ind.; John D. Shurboff, Coral Springs, Fla.

[73] Assignee: Essex Group, Inc., Fort Wayne, Ind.

[21] Appl. No.: 57,521

[22] Filed: Jul. 13, 1979

[51] Int. Cl.³ .............................................. C08L 79/08
[52] U.S. Cl. ........................ 260/29.2 N; 260/29.2 E; 428/379; 428/458; 428/473.5; 525/434; 528/288; 528/289
[58] Field of Search ...................... 260/29.2 N, 29.2 E

[56] References Cited

U.S. PATENT DOCUMENTS

| | | | |
|---|---|---|---|
| 3,448,068 | 6/1969 | Holub et al. | 260/29.2 |
| 3,625,873 | 12/1971 | Wilson | 260/2.5 B |
| 3,652,511 | 3/1972 | Vincent et al. | 260/78 UA |
| 3,666,723 | 5/1972 | Kray et al. | 260/65 |
| 3,737,478 | 6/1973 | Boddebuck | 260/78 UA |
| 3,766,117 | 10/1973 | McQuade | 260/29.2 N |
| 3,882,085 | 5/1975 | Schmitt et al. | 260/65 |
| 3,925,313 | 12/1975 | Kojima et al. | 260/47 CP |
| 3,966,655 | 6/1976 | Kovacs et al. | 260/29.2 N |
| 3,984,375 | 10/1976 | Frost | 260/47 CP |
| 4,075,179 | 2/1978 | Karkoski et al. | 260/75 N |
| 4,104,221 | 8/1978 | Janssen et al. | 260/29.2 E |
| 4,116,941 | 9/1978 | Hanson | 260/29.2 E |

FOREIGN PATENT DOCUMENTS 2630758 2/1977 Fed. Rep. of Germany .

*Primary Examiner*—Theodore E. Pertilla
*Attorney, Agent, or Firm*—Harry J. Gwinnell

[57] ABSTRACT

A method of making aqueous solutions of polyesterimides and the resulting solutions are disclosed. The disclosed method is particularly adapted to making aqueous solutions of high molecular weight polyesterimides with low acid numbers. The resulting aqueous polymer solutions can also be made with high polymer solids content. Solubilization takes place utilizing a base to open imide bonds in the ester-imide polymer chain. The polymer solution has particular utility as a wire enamel.

13 Claims, No Drawings

AQUEOUS SOLUTIONS OF POLYESTERIMIDES AND METHODS OF MAKING THE SAME

BACKGROUND OF THE INVENTION

1. Field of the Invention

The field of art to which the invention pertains is water containing solvent systems of nitrogen containing carbon compounds, compositions and methods of making the same.

2. Description of the Prior Art

With increased awareness of environmental pollution and energy resource depletion, attempts have been made to eliminate the need for organic solvent systems for polymer solutions. One approach to this problem has been the use of polymer systems which can be used in the hot melt state. Note, for example, U.S. Pat. No. 4,075,179. Another approach to this problem has been a replacement of organic solvents with water solutions. However, one problem which has been encountered in attempting to work up aqueous solutions of useful industrial polymers is the limited solubility of such polymers in water. Accordingly, it has been necessary to either start with low molecular weight polymers; mix water with organic solvent systems; build high acid numbers into the polymers; use strong bases in conjunction with the water to dissolve such polymers; and/or use dilute solutions of low solubility polymers.

For example, U.S. Pat. No. 3,737,478 which teaches polymer systems using water as a solvent, specifically requires large amounts of organic solvent and requires large amounts of strong bases to obtain useful degrees of water solubility. Furthermore, such polymer compositions are used in relatively low solids concentration. The starting polymers of this system also require relatively high acid values. In these typical prior art systems, to attain useful degrees of solubility, materials of relatively low molecular weights and high acid values are used as starting materials. Since these materials are of low molecular weight, it is necessary to include various additives, both reactants and catalysts, to these water systems to attain polymer molecular weights high enough to impart useful properties in use, for example, after application to a wire. In addition to complicating the chemistry involved in utilizing such polymers, these additives lend a certain degree of unpredictability and difficulty of standardization to the final products.

Accordingly, what is needed in the art is a method of making aqueous solutions of polymers which can be solubilized at high molecular weights without the addition of large amounts of organic solvents, and with high polymer solids content without regard for possible low acid numbers of the polymeric starting material.

BRIEF SUMMARY OF THE INVENTION

According to the present invention, a method of water solubilizing high molecular weight polyesterimides and the resulting solution have been found which do not require high acid value starting material or organic co-solvents and can produce aqueous solutions with high polymer solids content. The process comprises solubilizing the polymer in water with a nitrogen containing base by opening imide bonds in the polymer chain. This provides polar groups resulting in water solubility. The polymer can be insolubilized, e.g., after application to a wire, by heating to remove the water and nitrogen solubilizing base, resulting in reformation of the imide bond. Polymers of molecular weights (weight average, $\overline{M}_w$) greater than 16,000 with acid numbers less than 2 can be solubilized producing solutions with polymer solids contents above 30% by weight.

DETAILED DESCRIPTION OF THE PREFERRED EMBODIMENTS

The solubilization process comprises adding a diluent such as ethylene glycol and/or phenol to a high molecular weight polyesterimide and mixing to attain a composition viscosity which will allow good base mixing in relatively short periods of mixing time. It is preferred and most efficient to prepare the polyesterimide and add the diluent to the formed polymer while it is still warm from reaction, as opposed to waiting for the reaction product to cool. When the thus diluted polymer is sufficiently cool so that the solubilizing nitrogen compound will not boil off, the nitrogen compound is added followed by the addition of water. The degree of solubilization can be measured by noting the increase in acid number of the composition. When the desired degree of solubilization is reached, e.g., acid number values greater than 50 are measured, the composition is further cooled and water is added to the degree necessary to obtain the desired final viscosity which will depend on the specific application method employed. Viscosities below 2500 cps at 30° C. are generally most useful for wire coating purposes.

It should be noted that the diluents of the present invention are distinct from co-solvents of the prior art in several respects. The primary function of the diluents of the present invention is viscosity adjustment which is desirable because of the high molecular weights usable with the present invention, e.g., greater than 16,000 $\overline{M}_w$ G.P.C. (Gel Permeation Chromatography) or greater than a Gardner-Holdt S viscosity at 40% solids in cresylic acid. By reducing the viscosity of the polymer prior to solubilizer addition, desirable rapid mixing is possible. Also, lower boiling point solubilizers can be used since the temperature of addition of the solubilizers can be lower with a less viscous polymer composition while still attaining satisfactory solubilizer-polymer mixing. Being able to use lower boiling solubilizers enables lower temperatures to be used in removing the solubilizers during polymer curing, e.g., after application to a wire, resulting in a faster processing time with less energy expended. However, as can be appreciated by those skilled in the art, the viscosity adjustment is not required for solubilization. As regards the prior art, (1) viscosity adjustment would not be necessary because of the lower molecular weight polymers being used and (2) co-solvent addition is necessary for solubilization.

While many amine solubilizing agents (including NH$_4$OH) can be used in the present invention, it is preferred to use amines of $K_b$ (dissociation constant) values less than $10^{-5}$. Alkanolamines are particularly suitable which have boiling points below 210° C. and especially in the 115° to 200° C. range which, e.g., allow them to effectively be removed from the resin during cure on wire in a relatively short period of time. 2-amino-2-methyl-1-propanol, 2-dimethylamino-2-methyl-1-propanol, and dimethylaminoethanol are three alkanolamines which are particularly suitable, and of course mixtures of two or more of the three compounds may also be used. It should also be noted that while prior art systems are generally used at low solids contents, the polymers of the present invention have the advantage of both high molecular weight and high solids content, and can be used at as high as 60% by weight or more and preferably at 45 to 55% solids content. As such, this would provide for much higher loading when applying such compositions to wire, for example.

In general, the polyesterimides of the present invention can be characterized as comprising the combination of:

an acid-imide component comprised of:
a tricarboxylic material unit represented by the following formula:

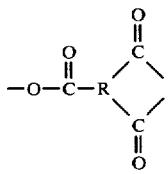

wherein: R is an organic trivalent radical; and an aliphatic, alicyclic, aromatic or heterocyclic diamine material unit represented by the following formula:

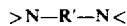

wherein: R' is a divalent organic radical; an ester component comprised of:
a hydroxyl containing material unit represented by the following formula:

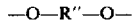

wherein: R" is an organic divalent radical; and a carboxyl containing material unit represented by the following formula:

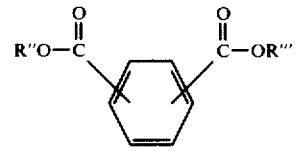

wherein: R''' is selected from the group consisting of hydrogen and lower alkyl groups; and a polycarboxylic and preferably tricarboxylic crosslink material component.

In general, the polyesterimides of the present invention can be further characterized by their ester component to acid-imide component (ester to imide) equivalent ratio, its hydroxyl containing material to carboxylic material (hydroxyl to carboxyl) equivalent ratio, and its tricarboxylic material and carboxyl material to tricarboxylic cross-link material (acid to cross-link) equivalent ratio, all of which will be more fully discussed hereinafter.

The term "equivalent" as used herein refers to the number of moles of a substance multiplied by the number of functional groups, i.e., carboxyl group (—COOH), ester group (where R is an alkyl), or hydroxyl group (—OH), present in its structure. For example, the number of equivalents of ethylene glycol is the number of moles of ethylene glycol present times two. The term "equivalent percent" as used herein refers to the number of equivalents of a particular reactant divided by the total number of equivalents of all reactants times 100. The compositions employed in the present invention are described in terms of equivalents instead of in terms of moles, since the ingredients which make up the polyesterimide polymer react equivalent for equivalent rather than mole for mole.

The polyesterimides can be prepared by forming a reaction mixture of the reactants in the proportions desired for the final polymer. This reaction mixture is heated at an elevated temperature, above about 100° C. and preferably from about 120°–130° C., for a sufficient time to form an acid-imide component, normally observed by a crust stage forming, and thereafter the temperature slowly raised to greater than about 180° C. and preferably about 200° C. to about 230° C. until a resin mix-off viscosity at 40% solids in cresylic acid is in the range of S to Z5 (Gardner-Holdt) (about 16,000 to 600,000 $\overline{M}_w$ G.P.C.). The resin is then allowed to cool to 170° C. and diluted with co-solvent before it is further cooled and neutralized with base for water solubilization.

For ultimate use viscosities of 400 to 2500 cps and solids contents of 45 to 55% by weight are preferred. Prior to solubilization the polyesterimides preferably have viscosities of X to Z2 and most preferably Z to Z2. The Gardner-Holdt viscosity measurements provide a relatively simple way of estimating the molecular weight of the starting polyesterimide polymer. Accordingly, while the invention encompasses use with polymers in the $\overline{M}_w$ range of 16,000 to 600,000, these are considered to be roughly equatable to Gardner-Holdt viscosities of S to Z5 as measured at 40% solids in cresylic acid solution. And as stated above, preferred are polymers with Gardner-Holdt viscosities of X to Z2 (roughly equivalent to $\overline{M}_w$ 50,000 to 220,000) and most preferred Z to Z2 (roughly 100,000 to 220,000).

The polycarboxylic material can be characterized by the following formula:

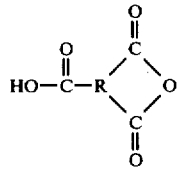

wherein: R is a trivalent organic radical.

While trimellitic anhydride is preferred as the polycarboxylic material, any of a number of suitable polycarboxylic constituents will occur to those skilled in the art including 2,6,7-naphthalene tricarboxylic anhydride; 3,3',4-diphenyl tricarboxylic anhydride; 3,3',4-benzophenone tricarboxylic anhydride; 1,3,4-cyclopentane tricarboxylic anhydride; 2,2',3-diphenyl tricarboxylic anhydride; diphenyl sulfone-3,3',4-tricarboxylic anhydride; diphenyl isopropylidene-3,3',4-tricarboxylic anhydride; 3,4,10-preylene tricarboxylic anhydride; 3,4-dicarboxyphenyl 3-carboxyphenyl ether anhydride; ethylene tricarboxylic anhydride; 1,2,5-naphthalene tricarboxylic anhydride; 1,2,4-butane tricarboxylic anhydride; and mixtures of the foregoing and the like.

The aromatic diamine material can be characterized by the following formula:

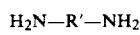

wherein: R' is a divalent aliphatic, alicyclic, aromatic or heterocyclic organic group.

While methylene dianiline is preferred as the aromatic diamine, any of a number of suitable aromatic diamine constituents will occur to those skilled in the art including 4,4'-diamino-2,2' sulfone diphenylmethane; meta-phenylene diamine; para-phenylene diamine; 4,4'-diamino-diphenyl propane; 4,4'-diamino-diphenyl methane benzidine; 2,6-diamino-pyridine; 2,4'-oxydianiline; 4,4'-diaminobenzophenone; bis(4-amino-phenyl)-N-methylamine, 3,3'-dimethyl-4,4'diamino-biphenyl; hexamethylene diamine; toluene diamine; m-xylylene diamine; p-xylylene diamine; polymethylene polyamine (Curithane®), (The Upjohn Co.) and mixtures of the foregoing and the like.

The hydroxyl containing material can be characterized by the following formula:

HO—R"—OH wherein: R" is an aliphatic divalent radical, preferably an alkane radical.

While ethylene glycol is preferred as the hydroxyl containing compound, any of a number of suitable diol or glycol constituents will occur to those skilled in the art including propanediols, butanediols, pentanediols, hexanediols, octanediols, and mixtures of the foregoing and the like. And while the dihydric alcohols are preferred, triols or higher polyols can also be used such as trishydroxyethyl isocyanurate, glycerine, trimethylolethane, trimethyolpropane, 1,2,5 hexanetriol, polyether triol, mono-, di- and tri-pentaerythritol, and mixtures thereof.

The preferred carboxyl containing material can be characterized by the following formula:

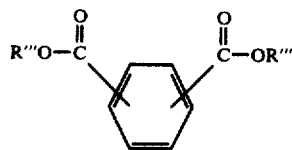

wherein: R''' is selected from the group consisting of hydrogen and lower alkyl groups, such as methyl, ethyl, n-propyl, isopropyl and the like, and other aliphatic, cyclic and heterocyclic groups, and mixtures thereof.

While dimethyl terephthalate ester is preferred as the carboxyl containing material, any of a number of suitable carboxyl constituents will occur to those skilled in the art including terephthalic acid, isophthalic acid, and the lower alkyl esters of each, such as the diethyl esters, dipropyl esters, dibutyl esters, and mixtures of the foregoing and the like.

The polycarboxylic cross-link material can be characterized by the preferred tricarboxylic acids of the following formula and the corresponding anhydrides thereof:

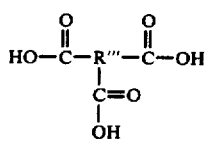

wherein: R'''' is a trivalent organic radical.

While trimellitic anhydride, trimellitic acid, trimesic acid and aliphatic polyacids are preferred as the polycarboxylic cross-link material, any of a number of suitable polycarboxylic or tricarboxylic cross-link materials will occur to those skilled in the art including aliphatic polyacids, those materials characterized by the same formula as used for the polycarboxylic material and described in relation thereto. Additionally, in conjunction with such materials can be used other cross-link materials including glycols, such as glycerol, tris (2-hydroxyethyl) isocyanurate, trimethyl propane and pentaerythritol; and amines, such as polymethylene and polyphenyl amines.

EXAMPLE 1

389 grams of ethylene glycol, 755 grams of trimellitic anhydride and 80 grams of isophthalic acid were mixed with 297 grams of methylene dianiline and 2 grams of tetrabutyl titanate (equivalent ratios: hydroxyl to carboxyl 1.85 to 1; ester to imide 2.25 to 1; diacid to triacid 2.5 to 1). The mixture was heated at 230° C. until a Gardner-Holdt viscosity of Z5 was obtained at 40% solids in cresylic acid. The polyesterimide formed was determined to have an acid number less than 2. The formed polyesterimide was cooled to 170° C. and diluted with a mixture of 165 grams diethylene glycol and 50 grams of 95% phenol. The mixture was cooled to 120° C. and mixed with 267 grams of dimethylaminoethanol in 75 grams of water. This mixture was held at 90° C. until an acid number of 100 was reached. The resulting mixture was cooled to 70° C. and diluted with 1,031 grams of water. When the mixture cooled to below 50° C., 85 grams of Tyzor® LA catalyst (titanate chelate, I. E. duPont de Nemours & Co., Inc.) in 85 grams of water was added to the mixture. The final product was found to have a solids content of 50.45%, a viscosity of 900 cps at 30° C., a pH of 6, and an acid number of 106. An 18 AWG copper wire coated with this aqueous solution at a rate of 45 ft/min. by standard techniques to a thickness of 2.8 mils was found to have the following properties: flexibility 25%+3X; slit twist adhesion 64; unilateral scrape grams 1496; dielectric breakdown 12,000 volts; thermoplastic flow 320° C.; heat shock 25%+3X, 200° C.; Emerson scrape at 16#, 5. Test methods used herein were those approved and described by ASTM in Bulletin D-1676.

EXAMPLE 2

198 grams of methylene dianiline, 640 grams of trimellitic anhydride, 260 grams of ethylene glycol, 8 grams of Tyzor LA and 118 grams of 90% phenol were reacted at 220° C. until a Gardner-Holdt viscosity of Z3 at 40% solids in cresylic acid was obtained (equivalent ratios: hydroxyl to carboxyl 1.4 to 1; ester to imide 3 to 1; and diacid to triacid 1 to 1). The acid number was determined to be less than 2. After cooling to 170° C., 86 grams of ethylene glycol were added. The mixture was cooled to 120° C. and 234 grams of dimethylaminoethanol mixed with 100 grams of water was added to the mixture and the mixture held at 90° C. until an acid number of 100 was reached. 413 grams of water was added when the mixture cooled to 70° C. and 50 grams of Tyzor LA added when the mixture cooled to below 50° C. The final enamel solution was clear, 54% solids and had a pH of 6.8 and a viscosity of 1000 cps. 18 AWG copper wire coated by standard coating techniques at 42 ft/min. to a thickness of 3.0 mils has the following properties: smoothness good, flexibility 25%+2X; dielectric breakdown 13,800 volts; thermoplastic flow 308° C.; heat shock 20%+3X, 200° C.; Emerson scrape at 16#, 8.

EXAMPLE 3

375 grams of 90% phenol, 582 grams of dimethyl terephthalate, 384 grams of trimellitic anhydride, 198 grams of methylene dianiline, 522 grams of tris(hydroxyethyl)isocyanurate, 186 grams of ethylene glycol and 1 gram of tetrabutyl titanate were reacted at 210° C. to a Gardner-Holdt viscosity of J at 25% solids in cresol. The mixture was cooled to 170° C. and 213 grams of dimethylaminoethanol were added. This mixture was cooled to 110° C. and 213 grams of water added. This mixture was held at 90° C. until an acid number of 80 was reached. To this mixture was added 900 grams of water giving a 47.75% solids content, a viscosity of 1300 cps, a pH of 8.2 and an acid number of 84. A wire coated with this composition by conventional techniques at a speed of 39 ft/min. to a thickness of 3.5 mils had the following properties: smoothness good; flexibility 25% +1X; unilateral scrape 2000; dielectric breakdown 14,000 volts; thermoplastic flow 245° C.; heat shock 0%+3X, 150° C.; Emerson scrape at 16#, 8.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A process of producing an aqueous solution of a polyesterimide having a weight average molecular weight of 16,000 to 600,000, an acid number less than 2 and consisting of a tricarboxylic acid anhydride component, a diamine component, an ester component, and a polycarboxylic cross-link material, comprising:
    mixing the polyesterimide with a low boiling amine solubilizing agent of $K_b$ less than $10^{-5}$, heating the mixture until an acid number greater than 50 is attained, and diluting with water to attain a viscosity at 30° C. less than 2,500 cps and a polymer solids content greater than 30% by weight.

2. A process of producing an aqueous solution of a polyesterimide consisting of reacting a mixture of ethylene glycol with trimellitic anhydride, methylene dianiline and optionally isophthalic acid or dimethyl terephthalate to form a polyesterimide of weight average molecular weight of 16,000 to 600,000, and acid number less than 2, mixing said polyesterimide in water with dimethylaminoethanol, 2-amino-2-methyl-1-propanol, 2-dimethylamino-2-methyl-1-propanol or mixtures thereof to solubilize said polyesterimide, and adding water to said solubilized polyesterimide to obtain a viscosity of 400 to 2,000 cps at 30° C. and a polymer solids content of 45 to 55% by weight.

3. A process of producing an aqueous solution of a polyesterimide having a weight average molecular weight of 16,000–600,000, an acid number less than 2 and consisting of a tricarboxylic acid anhydride component; a diamine component; an ester component wherein the hydroxyl reactant to form such ester component is selected from the group consisting of a dihydric alcohol, glycerine, trimethylolethane, trimethylolpropane, 1, 2, 5 hexanetriol, polyether triol, monopentaerythritol, dipentaerythritol, tripentaerythritol, and mixtures thereof; and a polycarboxylic cross-link material; comprising
    mixing the polyesterimide with a low boiling amine solubilizing agent of $K_b$ less than $10^{-5}$, heating the mixture until an acid number greater than 50 is attained, and diluting with water to attain a viscosity at 30° C. less than 2500 cps and a polymer solids content greater than 30% by weight.

4. The process of claims 1, 3 or 2 wherein the polyesterimide has an acid number less than 1.

5. The process of claims 1 or 3 wherein the solubilizing agent is aminomethylpropanol, 2-amino-2-methyl-1-propanol, 2-dimethylamino-2-methyl-1-propanol or mixtures thereof.

6. The process of claims 1, 3 or 2 wherein the polyesterimide before solubilizing has a Gardner-Holdt viscosity at 30° C. of X to Z2 at 40% solids in cresylic acid.

7. The process of claims 1, 3 or 2 wherein the polyesterimide before solubilizing has a Gardner-Holdt viscosity at 30° C. of Z to Z2 at 40% solids in cresylic acid.

8. An aqueous solution of a polyesterimide having a weight average molecular weight of 16,000 to 600,000, an acid number less than 2 and consisting of a tricarboxylic acid anhydride component, a diamine component, an ester component, and a polycarboxylic cross-link material, with polymer solids content greater than 30% by weight and a viscosity at 30° C. less than 2,500 cps.

9. An aqueous solution of a polyesterimide consisting of a polyesterimide formed by reaction of ethylene glycol with trimellitic anhydride, methylene dianiline and optionally isophthalic acid or dimethylterephthalate, said polyesterimide having a weight average molecular weight of 16,000 to 600,000 and acid number less than 2, said solution having a viscosity at 30° C. of 400 to 2,500 cps., and polymer solids content of 45 to 55% by weight.

10. An aqueous solution of a polyesterimide having a weight average molecular weight of 16,000–600,000, an acid number less than 2 and consisting of a tricarboxylic acid anhydride component; a diamine component; an ester component wherein the hydroxyl reactant to from such ester component is selected from the group consisting of a dihydric alcohol, glycerine, trimethylolethane, trimethylolpropane, 1, 2, 5 hexanetriol, polyether triol, monopentaerythritol, dipentaerythritol, tripentaerythritol and mixtures thereof; and a polycarboxylic cross-link material; with polymer solids content greater than 30% by weight and a viscosity at 30° C. less than 2500 cps.

11. The aqueous solution of claims 8, 10 or 9 wherein the acid number of the polyesterimide is less than 1.

12. The aqueous solution of claims 8, 10 or 9 wherein the polyesterimide has a Gardner-Holdt viscosity at 30° C. of X to Z2 at 40% solids in cresylic acid.

13. The aqueous solution of claims 8, 10 or 9 wherein the polyesterimide has a Gardner-Holdt viscosity at 30° C. of Z to Z2 at 40% solids in cresylic acid.

* * * * *